United States Patent Office 3,193,397
Patented July 6, 1965

3,193,397
PHOSPHONITRILIC FLAMEPROOFING
MATERIALS
Robin W. Stephens, Baltimore, and Bernard Grushkin, Silver Spring, Md., assignors to W. R. Grace & Co., a corporation of Connecticut
No Drawing. Filed Jan. 22, 1962, Ser. No. 167,893
8 Claims. (Cl. 106—15)

The present invention relates to flameproofing compositions, and more specifically to water insoluble organic compounds which are effective flame retardants for flammable textile fibers.

In the past a great number of inorganic compounds which have been evaluated as flame retardants for textile materials have been found to possess flame retarding properties even when applied in relatively small amounts. However, it has been found that the majority of the truly efficient inorganic flame retardants are water soluble and hence, are easily removed during washing procedures. Attempts to produce water insoluble inorganic flame retardants resulted in compositions which are often difficult to apply and inefficient in the sense that relatively large amounts are required to provide an adequate flame resistance property.

The general disadvantages possessed by the inorganic flame retardants has led more recent investigators to contemplate organic compounds as possible flameproofing materials. It has been reasoned that the general water insolubility characteristics which are often possessed by organic compounds should make them desirable flameproofing additives. Preliminary investigations indicated that organic compounds which are of particular interest are substituted organic compounds (or in some cases organic substituted inorganic compounds) which possess substituents of a non-flammable nature. Compounds containing halogens, phosphorus and/or nitrogen have often been found to be particularly effective flame retardants. However to date most organic derivatives containing these substituents have found relatively limited use in that relatively large quantities of them are required to produce a minimum amount of flame retardant properties. Furthermore, many proposed organic flame retardant compositions have been found to be unstable towards washing conditions and are frequently deactivated when exposed to detergent solutions used in everyday washing procedures.

It is therefore an object of the present invention to provide an improved organic type flameproofing additive for textile fibers.

It is a further object to provide a flame resistant textile material which is durable and which has incorporated therein a relatively small proportion of flameproofing material.

It is still a further object to provide a method for flameproofing fiberous materials, particularly those of cellulose nature or origin, which efficiently and inexpensively imparts a durable flame resistant finish thereto.

These and still further objects of the present invention will become readily apparent to one skilled in the art from the following detailed description and specific examples.

Broadly, the present invention contemplates the imparting of a flame retardant finish to normally flammable textile fiber structures by applying thereto an aminophenyl phosphonitrilic polymer.

More specifically, the present invention involves flame retardant compounds of the general formula

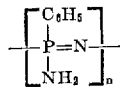

wherein $n$ has a value of from 3 to 16 which may be added to flammable fibers in amounts of from about ½ to about 20% by weight of the fibers to provide a high degree of flame resistance.

The phosphonitrilic polymers utilized in the present invention are obtained by first reacting phenylphosphorus tetrachloride ($C_6H_5PCl_4$) with an excess of ammonium chloride ($NH_4Cl$) in an inert solvent to obtain a mixture of phenyl chlorophosphonitrilic polymers having the general formula

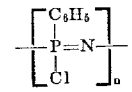

wherein $n$ has a value of from about 3 to about 16. The mixture of phenyl chlorophosphonitrilic polymers is then ammoniated with an excess of ammonia ($NH_3$) in the presence of an inert solvent to obtain the corresponding mixture of aminophenylphosphonitrilic polymers having the formula

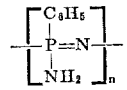

wherein $n$ has the value of from 3 to 16 for use in the practice of the present invention.

When the flameproofing polymers utilized in the present invention are to be applied to fiberous structures, they are preferably applied in the form of a dilute solution. Suitable solvents which may be used to prepare the film treating solutions are volatile solvents such as chloroform. The solutions may be applied by any conventional technique such as padding, dipping, spraying, and brushing. Normally a sufficient amount of solution is added to the fiber to deposit the required amount of flameproofing material on the fiber upon evaporation of the solvent.

The amounts of flameproofing agent deposited upon a given fabric will vary depending upon the nature of the fabric and the degree of flameproofing required. Generally speaking for natural cellulose fibers such as cotton it is found that as low as 1% by weight of the presently intended composition will yield a considerable improvement in flame resistance, and an amount of flameproofing material equal to about 8% by weight of cotton fabric will render the fabric substantially flame resistant, that is, will render the fabric incapable of supporting a flame. Amounts up to about 20% may easily be added if a maximum amount of flame resistance is required. However for normal application an "add-on" of from about 2% to about 12% is generally contemplated.

Materials which may be advantageously treated in accordance with the present invention are primarily natural cellulose fibers such as cotton, hemp, wood, linen, jute and sisal. The invention may also be advantageously applied to cellulose products manufactured from regenerated cellulose such as rayon and various paper products. So called synthetic fibers such as derived from polyesters and polyamides may also be advantageously treated.

Throughout the remainder of the present disclosure tests for flammability of the textiles were carried out in accordance with the test bearing ASTM Designation: D 1230–52T wherein a test strip of cloth is ignited in a given manner and a burning rate thereof is determined.

Having described the basic aspects of the present invention the following specific example is given to illustrate a specific embodiment thereof.

*Example*

A flameproofing composition was prepared by first reacting 6 moles of phenylphosphorus tetrachloride with 12 moles of ammonium chloride and refluxing chlorobenzene. The reaction was continued until no more hydrogenchloride gas evolved from the reaction mixture. The excess of ammonium chloride was removed by filtration and the volume of the filtrate was reduced to 2 to 3 liters. One-half of this solution was then evaporated to dryness whereupon approximately 3 moles of phenylchlorophosphonitrilic polymer was obtained. This residue was then redissolved in chloroform and solution was added dropwise to a chloroform solution which was saturated with ammonia at room temperature. After about 4 hours treatment with ammonia in room temperature 182 g. of ammonium chloride was recoverd by filtration. Upon standing a large amount of solid identified as

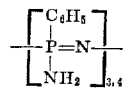

having a melting point of 195 to 207° C. was obtained. The volume of the solution was then further reduced until no further solids precipitated. The final filtrate was a brown liquid. When solvent was completely removed from this filtrate the tarry solid having the formula

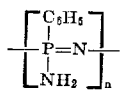

wherein $n$ has the value of from 3 to 16 was obtained. Sufficient chloroform was then added to this residue to make up a solution containing 18% of the residue by weight. This solution was used in the succeeding flameproofing test.

Portions of the above solution diluted to obtain chloroform solutions containing 0.9, 3.6, and 7.2 percent of the polymer. Samples of cotton duck, 2 x 6 inches wide (10 oz./sq. yard, 54 x 30 per inch thread count) were used as the test fabric. These samples of fabric were immersed in the respective solutions for one-half hour, dried and weighed. The amount of polymer "add-on" was calculated and the corresponding burning times of the samples determined in accordance with ASTM test D 1230–52T were determined. The results of these tests are tabulated below.

| Run | Blank | A | B | C |
|---|---|---|---|---|
| Concentration of Solution (Percent) | 0 | 0.9 | 3.6 | 7.2 |
| Weight of Fabric Sample (g.) | 2.3 | 2.3 | 2.3 | 2.3 |
| "Add-on" (g.) | 0 | 0.023 | 0.1 | 0.2 |
| Weight Percent of "Add-on" | 0 | 1 | 4 | 8 |
| Time of Flame Spread (Sec.) | 20 | 37 | 48 | (¹) |

¹ Flame not supported.

The above example clearly illustrates that the flameproofing compositions contemplated herein serve effectively to render fabrics flame resistant.

We claim:
1. A method for rendering textile fibers flame resistant which comprises applying a phenylaminophosphonitrilic polymer having the formula:

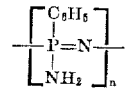

wherein, $n$ has the value of 3 to 16, dissolved in an inert solvent to a textile fiber, and evaporating said solvent to deposit said polymer upon said fiber.

2. The method of claim 1 wherein from about ½ to about 20% by weight said polymer deposited on said fiber.

3. The method of claim 2 wherein the fiber is cotton.

4. The method of claim 2 wherein the inert solvent is chloroform.

5. A flameproofing composition for application to flammable textile fibers which consists essentially of a phenyl aminophosphonitrilic polymer having the formula:

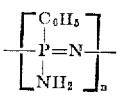

wherein $n$ has a value of from 3 to 16 dissolved in an inert volatile solvent.

6. The composition of claim 5 wherein the inert volatile solvent is chloroform.

7. A flame resistant textile which consists essentially of a textile fiber impregnated with from about ½ to about 20% by weight of a phenylamino phosphonitrilic polymer having the formula

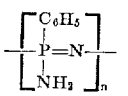

wherein $n$ has a value of from 3 to 16.

8. The flame resistant textile of claim 7 wherein the fiber is cellulose fiber.

References Cited by the Examiner

UNITED STATES PATENTS 2,637,704    5/53    Hurley _____ 106—15

OTHER REFERENCES

Shaw et al.: Chemistry and Industry, London (pages 52 and 53 relied upon), vol. January-March 1959.

ALEXANDER H. BRODMERKEL, *Primary Examiner.*

JOHN H. MACK, MORRIS LIEBMAN, *Examiners.*